United States Patent
Grant et al.

(10) Patent No.: US 7,542,425 B2
(45) Date of Patent: Jun. 2, 2009

(54) TRAFFIC MANAGEMENT USING IN-BAND FLOW CONTROL AND MULTIPLE-RATE TRAFFIC SHAPING

(75) Inventors: Kevin S. Grant, Piscataway, NJ (US);
Mark Benjamin Simkins, Macungie, PA (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 955 days.

(21) Appl. No.: 10/689,090

(22) Filed: Oct. 20, 2003

(65) Prior Publication Data

US 2005/0005021 A1   Jan. 6, 2005

Related U.S. Application Data

(60) Provisional application No. 60/472,176, filed on May 21, 2003.

(51) Int. Cl.
*H04L 1/00* (2006.01)
(52) U.S. Cl. .................. 370/236; 370/410; 370/469
(58) Field of Classification Search ............ 370/230, 370/229, 235, 236, 410, 469
See application file for complete search history.

(56) References Cited

U.S. PATENT DOCUMENTS

2002/0075540 A1*  6/2002  Munter .................. 359/128
2002/0176357 A1*  11/2002  Lay ...................... 370/229
2005/0278503 A1*  12/2005  McDonnell ............ 712/34

OTHER PUBLICATIONS

Agere Systems, Product Brief, "Edge/Access and Multiservice Network Processors: APP550 and APP530," pp. 1-4, May 2003.
Implementation Agreement OIF-SPI3-01.0, "System Packet Interface Level 3 (SPI-3): OC-48 System Interface for Physical and Link Layer Devices," Optical Internetworking Forum, pp. 1-42, 2001.

* cited by examiner

*Primary Examiner*—Seema S Rao
*Assistant Examiner*—Wanda Z Russell
(74) *Attorney, Agent, or Firm*—Ryan, Mason & Lewis, LLP

(57) ABSTRACT

Backpressure information is communicated from a physical layer device to a link layer device in a communication system by generating a flow control message in the physical layer device responsive to a detected condition relating to at least a given one of a plurality of queues of the physical layer device, and transmitting the flow control message from the physical layer device to the link layer device. The flow control message may comprises backpressure information associated with a given egress queue of the physical layer device and is transmitted from the physical layer device to the link layer device as an in-band message over an interface between the physical layer device and the link layer device. Multiple-rate traffic shaping or other types of traffic shaping may be provided responsive to the flow control message.

20 Claims, 8 Drawing Sheets

FIG. 2

| F | A | C | I | FCS | F |
|---|---|---|---|-----|---|

| FIELD NAME | SIZE (BITS) |
|---|---|
| FLAG FIELD (F) | 8 BITS |
| ADDRESS FIELD (A) | 8 BITS |
| CONTROL FIELD (C) | 8 OR 16 BITS |
| INFORMATION FIELD (I) | VARIABLE |
| FRAME CHECK SEQUENCE (FCS) | 16 OR 32 BITS |

FIG. 3

| | PACKET OVERHEAD (ASSUMING MAX SIZE FOH = 8B) | | | |
|---|---|---|---|---|
| | FOH | SOH | PS | % OH |
| NO STUFFING, MIN SIZED PACKET | 8 | 0 | 40 | 20% |
| MAX STUFFING, MIN SIZED PACKET | 8 | 8 | 40 | 40% |
| NO STUFFING, MAX SIZED PACKET | 8 | 0 | 9600 | 0.08% |
| MAX STUFFING, MAX SIZED PACKET | 8 | 1920 | 9600 | 20% |

ASSUMPTIONS:

a) PACKET SIZE (PS):
      40 - 9600 BYTES b) WORST-CASE HDLC BIT STUFFING OVERHEAD (SOH)
      20% OF (a) = 8 - 1920 BYTES c) HDLC FRAME OVERHEAD (FOH)
      5 - 8 BYTES

FIG. 9

| PARAMETER DEFINITIONS | |
|---|---|
| $R_{PORT}$ : NOMINAL DATA RATE OF A PLD HDLC CHANNEL CORRESPONDING TO AN EQ.<br><br>$R_{FILL}$ : DATA INPUT (ENQUEUE) RATE OF PLD EQ.<br><br>$R_{DRAIN}$ : DATA OUTPUT (DEQUEUE) RATE OF PLD EQ.<br><br>FCL : FLOW CONTROL LATENCY. | $D_{MTU}$ : DELAY DUE TO TRANSMISSION OF AN MTU-SIZED PACKET FROM LLD CoS QUEUE.<br><br>$D_{LLD}$ : WORST-CASE CLASSIFICATION DELAY OF LLD.<br><br>$D_{PIPE}$ : OUTPUT PIPELINE DELAY OF LLD.<br><br>$D_{PLD}$ : PLD DELAY IN TRANSMITTING IBFC MESSAGE. |

$$\text{Buff} = |R_{FILL} - R_{DRAIN}| * \text{FCL}$$
$$|R_{FILL} - R_{DRAIN}| = |R_{PORT} - 0.8\, R_{PORT}| = 0.2 * R_{PORT}{}^\dagger$$
$$\text{FCL} = D_{MTU} + D_{LLD} + D_{PIPE} + D_{PLD}{}^\ddagger$$

USE THE FOLLOWING FACTS AND WORST-CASE ASSUMPTIONS:
$$D_{MTU-L} = MTU \div (0.8 * R_{PORT});\quad D_{MTU-U} = MTU \div R_{PORT}$$
$$D_{LLD} \leq 20\,\mu sec.^{\dagger\dagger}$$
$$D_{PIPE} \leq 6\,\mu sec.^{\ddagger\ddagger}$$
$$D_{PLD} \leq 1\,\mu sec.^{\S}$$

$$\text{Buff}_{UNDER} = (0.2 * R_{PORT}) * ([MTU/(0.8 * R_{PORT})] + 20\,\mu s + 6\,\mu s + 1\,\mu s)$$
$$= (0.2 * R_{PORT}) * ([MTU/(0.8 * R_{PORT})] + 27\,\mu s)$$
$$= R_{PORT} * ([0.25 * MTU/R_{PORT}}] + 5.4\,\mu s)$$
$$= (0.25 * MTU) + (R_{PORT} * 5.4\,\mu s)$$

$$\text{Buff}_{OVER} = (0.2 * R_{PORT}) * ([MTU/R_{PORT}] + 20\,\mu s + 6\,\mu s + 1\,\mu s)$$
$$= (0.2 * R_{PORT}) * ([MTU/R_{PORT}] + 27\,\mu s)$$
$$= R_{PORT} * ([0.2 * MTU/R_{PORT}}] + 6.75\,\mu s)$$
$$= (0.2 * MTU) + (R_{PORT} * 6.75\,\mu s)$$

$\dagger$ HDLC $R_{DRAIN}$ IS AT MOST 20% GREATER OR LESS THAN SCHEDULER $R_{FILL}$ $\ddagger$ FCL IS EQUAL TO THE SUM OF THE DELAYS (D) SHOWN $\dagger\dagger$ W.C. DELAY OF THE FLOW CONTROL MESSAGE THROUGH CLASSIFICATION TO THE TRAFFIC SHAPER $\ddagger\ddagger$ LLD OUTPUT PIPELINE DELAY $\S$ W.C. DELAY FROM FLOW CONTROL MESSAGE GENERATION IN PLD TO TRANSMISSION ON THE SPI-3 INGRESS INTERFACE

FIG. 10

| HDLC CHANNEL SIZE | HDLC CHANNEL RATE (IN Kbps) | MTU (IN BYTES) | Buff$_{UNDER}$ (IN BYTES) | Buff$_{OVER}$ (IN BYTES) | LOWER BOUND EQ SIZE (IN BYTES) | WORST-CASE EQ SIZE (IN BYTES) |
|---|---|---|---|---|---|---|
| DS0 | 64<br>64<br>64 | 576<br>1518<br>9600 | 145<br>380<br>2401 | 116<br>304<br>1921 | 261<br>684<br>4322 | 586<br>1432<br>8708 |
| DS1 | 1544<br>1544<br>1544 | 576<br>1518<br>9600 | 146<br>381<br>2402 | 117<br>305<br>1922 | 263<br>686<br>4324 | 590<br>1436<br>8712 |
| 8 × DS1 | 12352<br>12352<br>12352 | 576<br>1518<br>9600 | 153<br>388<br>2409 | 126<br>315<br>1931 | 279<br>703<br>4340 | 622<br>1470<br>8744 |

TRAFFIC MANAGEMENT USING IN-BAND FLOW CONTROL AND MULTIPLE-RATE TRAFFIC SHAPING

RELATED APPLICATION(S)

The present application claims the priority of U.S. Provisional Application Ser. No. 60/472,176, filed May 21, 2003 and entitled "Traffic Management of Packet-Based Applications," the disclosure of which is incorporated by reference herein.

FIELD OF THE INVENTION

The present invention relates generally to network-based communication systems, and more particularly to traffic management techniques for use in a communication system in which a physical layer device communicates with a link layer device.

BACKGROUND OF THE INVENTION

A network processor is one example of what is more generally referred to herein as a link layer device. Such link layer devices, which can be used to implement packet-based protocols such as Internet Protocol (IP) and Asynchronous Transfer Mode (ATM), are also commonly known as Layer-3 (L3) devices in accordance with the well-known Open System Interconnect (OSI) model.

Communication between a physical layer device and a network processor or other type of link layer device may be implemented in accordance with an interface standard, such as the SPI-3 interface standard described in Implementation Agreement OIF-SPI3-01.0, "System Packet Interface Level 3 (SPI-3): OC-48 System Interface for Physical and Link Layer Devices," Optical Internetworking Forum, 2001, which is incorporated by reference herein. A given physical layer device may comprise a multiple-port device which communicates over multiple channels with the link layer device. Such channels are also referred to herein as MPHYs. As is well known, a link layer device may be advantageously configured to detect backpressure (BP) for a particular MPHY via polling of the corresponding MPHY address on the physical layer device. The detected backpressure is used by the link layer device to provide flow control and other traffic management functions, thereby improving link utilization.

A significant problem that can arise when utilizing the SPI-3 interface standard is that the standard supports a maximum of only 256 MPHYs. Although this is substantially more than other similar interfaces, such as POS-2, it nonetheless fails to meet the requirements of many high channel count (HCC) packet-based applications. For example, consider an application involving an OC-12 (Optical Carrier 12) channelized link, which has a data rate of 12*51.84 Mbps=622.08 Mbps. In such an application, it may be desirable to provide per-DS0 access to substantially the entire OC-12 facility, comprising, for example, a total of up to 8064 DS0 channels, where DS0 (Digital Signal 0) generally denotes a 64 kbps signal. The network processor should therefore ideally support flow control for all of the DS0 channels. Unfortunately, the current SPI-3 interface standard falls far short of this goal.

Accordingly, a need exists for improved techniques for communicating information between a link layer device and a physical layer device, so as to facilitate backpressure detection and related traffic management functions, particularly in HCC packet-based applications.

SUMMARY OF THE INVENTION

The present invention meets the above-noted need by providing in a first aspect of the invention an in-band flow control mechanism which facilitates the delivery of backpressure information from a physical layer device to a link layer device in a communication system. Another aspect of the invention relates to the provision of traffic shaping responsive to a flow control message received in a link layer device from a physical layer device.

In accordance with the first aspect of the invention, backpressure information is communicated from a physical layer device to a link layer device in a communication system. A flow control message is generated in the physical layer device responsive to a detected condition relating to at least a given one of a plurality of queues of the physical layer device, such as a given egress queue, and the flow control message is then transmitted from the physical layer device to the link layer device. The flow control message may comprise backpressure information associated with the given egress queue of the physical layer device and is transmitted from the physical layer device to the link layer device as an in-band message over an interface between the physical layer device and the link layer device. The interface may be an otherwise conventional standard interface, such as an SPI-3 ingress interface.

In an illustrative embodiment, the given egress queue of the physical layer device has an upper threshold and a lower threshold associated therewith, corresponding to respective fullness levels of the egress queue. The flow control message comprises backpressure information indicating, for example, that the egress queue fullness has crossed the upper threshold from below that threshold, or that the egress queue fullness has crossed the lower threshold from above that threshold. The flow control message thus identifies a particular one of a plurality of detected conditions relating to the given egress queue, with the plurality of detected conditions comprising at least an over-threshold condition and an under-threshold condition. The flow control message may comprise, in addition to the backpressure information, an identifier of the given egress queue with which the backpressure information is associated. The identifier may comprise, for example, a logical MPHY value corresponding to the given egress queue.

As indicated above, another aspect of the invention relates to the provision of multiple-rate traffic shaping or other types of traffic shaping responsive to an in-band flow control message or other type of flow control message. More generally, a link layer device may be configured to receive from a physical layer device of the system a flow control message responsive to a detected condition relating to at least a given one of a plurality of egress queues of the physical layer device. The link layer device then selects one of a plurality of available traffic shaping characteristics for utilization with a given channel between the link layer device and the physical layer device, based at least in part on the flow control message.

In an illustrative embodiment, multiple-rate traffic shaping is provided by configuring the link layer device to select one of a plurality of available scheduling rates for a channel associated with the egress queue of the physical layer device, responsive to backpressure information in the flow control message. For example, the link layer device may be operative to provide the multiple-rate traffic shaping by selecting a first one of the plurality of available scheduling rates for the channel if the backpressure information indicates an under-threshold condition, and selecting a second one of the plurality of available scheduling rates for the channel if the backpressure information indicates an over-threshold condition. In the High-level Data Link Control (HDLC) context, suitable first and second rates may correspond to 100% and 80%, respectively, of a nominal HDLC channel rate.

Advantageously, the invention provides improved detection of backpressure, particularly for HCC packet-based applications, and can be implemented using an SPI-3 interface or other standard interface while overcoming the above-noted limitations of such standard interfaces. It also provides improved traffic shaping techniques, such as multiple-rate shaping, responsive to detected backpressure.

BRIEF DESCRIPTION OF THE DRAWINGS

FIG. 2 shows an example HDLC packet payload utilizable in the FIG. 1 system.

FIG. 3 illustrates variation in packet overhead which can result when utilizing the HDLC packet payload of FIG. 2.

FIGS. 9 and 10 are tables showing example buffer size computations for the egress queue of FIG. 8.

DETAILED DESCRIPTION OF THE INVENTION

Figure 1:
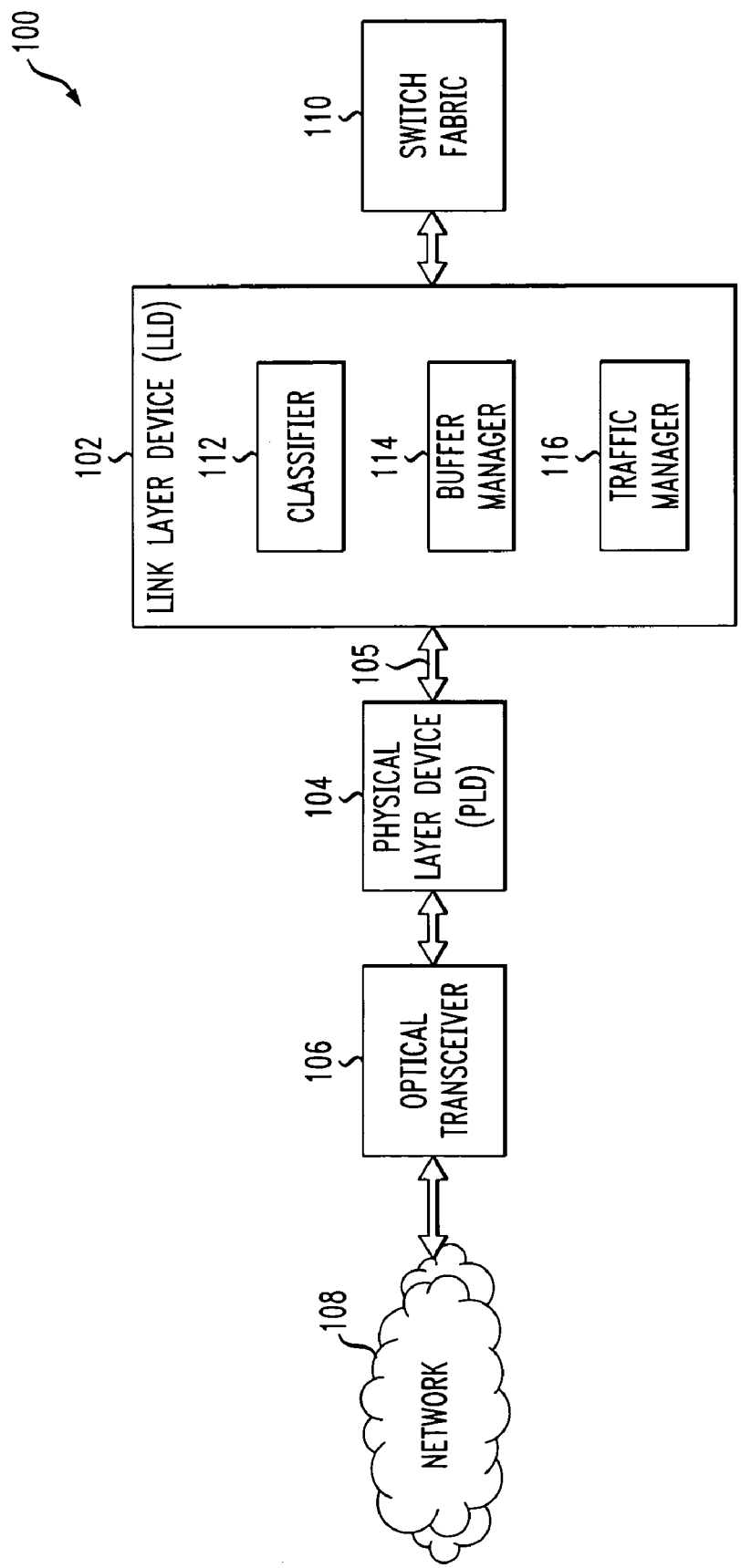
FIG. 1 is a simplified block diagram of a network-based communication system in which the present invention is implemented.

The invention will be illustrated herein in conjunction with an exemplary network-based communication system which includes a link layer device, a physical layer device and other elements configured in a particular manner. It should be understood, however, that the invention is more generally applicable to any system in which it is desirable to provide improved traffic shaping through the use of at least one of in-band flow control and multiple-rate traffic shaping as described herein.

The term "in-band" as used herein is intended to include, by way of example and without limitation, an arrangement in which additional information is transmitted utilizing an existing standard interface, such as an SPI-3 or other similar interface, between a link layer device and a physical layer device, where the additional information is of a type not normally associated with the standard interface.

A "link layer device" or LLD as the term is used herein refers generally to a network processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" or PLD as the term is used herein refers generally to a device which provides an interface between a link layer device and a physical transmission medium of a network-based system.

As indicated above, HCC packet-based applications often require monitoring of more physical backpressure points than can be supported using a standard interface such as SPI-3. The physical layer device may be configured such that backpressure points can be flexibly configured per egress queue or per group of egress queues and independently mapped to any MPHY address. It is also possible to extend the SPI-3 interface through the addition of MPHY polling address lines to the physical layer device. However, the latter approach fails to provide an adequate solution to the problem because it requires that the link layer device also be configured to support the extensions, which is impractical in many applications. The present invention overcomes this problem by providing in an illustrative embodiment an improved interface which utilizes in-band flow control and multiple-rate traffic shaping techniques. Advantageously, the techniques of the invention provide enhanced backpressure detection capabilities without requiring additional MPHY polling address lines.

It should be noted that a given embodiment of the invention may utilize only the in-band flow control techniques, only the multiple-rate traffic shaping techniques, or a combination of both techniques. For example, a given embodiment may utilize an in-band flow control technique of the invention with an otherwise conventional type of traffic shaping, or may use a multiple-rate traffic shaping technique of the invention with an otherwise conventional type of flow control. Although the present invention does not require the use of both an in-band flow control techniques of the invention and a multiple-rate traffic shaping technique of the invention in a single embodiment, it will generally be preferable in to use such techniques together.

FIG. 1 shows a network-based communication system 100 in which the invention is implemented. The system 100 includes a link layer device (LLD) 102 coupled to a physical layer device (PLD) 104 via an interface 105. The PLD 104 is coupled via an optical transceiver 106 to a network 108. The LLD 102 is coupled to a switch fabric 110. The LLD 102 is configured to communicate packets, cells or other protocol data units (PDUs) between the network 108 and the switch fabric 110 which controls switching of PDU data. The PLD 104 and optical transceiver 106 serve to interface the LLD to physical transmission media of the network 108, which are assumed in this case to comprise optical transmission media.

The LLD 102 may comprise, for example, a network processor such as a PayloadPlus® network processor in the APP500 or APP750 product family, commercially available from Agere Systems Inc. of Allentown, Pa., U.S.A.

The PLD 104 may comprise one or more devices suitable for providing access termination and aggregation for multiple services, or any other physical layer device of a type known to those skilled in the art.

It is to be appreciated that the invention is not limited to use with any particular type of LLD or PLD. Numerous such devices suitable for use with the present invention are well known to those skilled in the art. The conventional aspects of these devices will therefore not be described in detail herein.

The LLD 102 as shown in FIG. 1 includes a classifier 112, a buffer manager 1 14 and a traffic manager 116. Such elements may be implemented as otherwise conventional network processor elements of a type known to those skilled in the art, suitably modified to incorporate the in-band flow control and multiple-rate traffic shaping techniques ofthe present invention. The LLD 102 will also generally include other elements of a type commonly found in a network processor or other type of LLD. For example, LLD 102 will typically include an internal memory, as well as an interface to an external memory. Such memory elements may be utilized for implementing PDU buffer memory, queuing and dispatch buffer memory, etc. The LLD may further include one or more memory controllers, as well as appropriate interface circuitry for interfacing with the PLD 104, the switch fabric 110, and other external devices, such as an associated host processor or other device which communicates with the LLD 102 over a standard bus architecture, e.g., a peripheral component interconnect (PCI) bus. The LLD may also include a scheduler, queuing and dispatch logic, as well as other conventional elements not explicitly shown in the figure. The operation of these and other conventional elements, being well understood by those skilled in the art, is not described in detail herein.

The PLD 104 may comprise a plurality of queues, including ingress queues and egress queues, as well as appropriate interface hardware for interfacing with the LLD 102 and the transceiver 106. In other embodiments, the transceiver 106 may be implemented within the PLD itself, such that the PLD interfaces directly with the network 106.

It is also possible that the LLD and the PLD may be integrated together into a single device, such as an ASIC. The terms LLD and PLD as used herein should therefore be understood to include any set of one or more functional components which perform respective LLD and PLD operations in a single device.

It should also be noted that the particular arrangement of system elements shown in FIG. 1 is by way of illustrative example only. More particularly, the invention can be implemented in any type of system having at least one LLD and at least one PLD, and is not limited to the particular processing applications described herein. The system 100 may include other elements in addition to or in place of those specifically shown, including one or more elements of a type commonly found in a conventional implementation of such a system.

The in-band flow control and multiple-rate traffic shaping techniques of the present invention as described herein may be implemented at least in part in the form of software program code. For example, these techniques may be implemented at least in part utilizing LLD or PLD elements that are programmable via instructions or other software.

A number of assumptions will be made in describing the illustrative embodiments of the invention below in conjunction with FIGS. 2 through 10. It should be understood that these and other assumptions made herein are for clarity and simplicity of description only, and should not be construed as constituting limitations of the invention.

One or more of the illustrative embodiments will be assumed to utilize at least one of High-level Data Link Control (HDLC) and Point-to-Point Protocol (PPP), although other protocols can of course be used.

A channel in the following description will be assumed to refer generally to a logical channel at the DS0 level. In the HDLC context, the term channel generally refers to logical channels, which are similar to virtual channels (VCs) in the ATM context.

A single physical link may carry a number of logical channels. A link in the illustrative embodiments may be, by way of example, a DS1 link comprising 24 DS0 channels and having a data rate of 1.544 Mbps, or an E1 link comprising 32 DS0 channels and having a data rate of 2.048 Mbps.

The term "egress" refers in the illustrative embodiments to the direction of data transfer from the network 108 to user equipment. The egress direction relative to the PLD 104 is thus the direction of data transfer from the PLD interface with the LLD 102 to the PLD interface with the transceiver 106.

The term "ingress" refers in the illustrative embodiments to the direction of data transfer from user equipment to the network 108. The ingress direction relative to the PLD 104 is thus the direction of data transfer from the PLD interface with the transceiver 106 to the PLD interface with the LLD 102.

The illustrative embodiments will be described in the context of an exemplary HCC packet-based application, namely, an application involving HDLC. The need for per-channel flow control in the HDLC context arises from the fact that the overhead on the packet payload can vary from almost 0 to about 40%, as will now be described in greater detail with reference to FIGS. 2 and 3. The two sources of this packet payload overhead in HDLC are frame overhead and bit-stuffing overhead.

FIG. 2 shows an example HDLC packet payload utilizable in the FIG. 1 system. The payload includes an 8-bit flag field (F), an 8-bit address field (A), an 8-bit or 16-bit control field (C), a variable-length information field (I), and a 16-bit or 32-bit frame check sequence (FCS).

FIG. 3 illustrates the variation in packet overhead which can result when utilizing the HDLC packet payload of FIG. 2. The diagram shows the frame overhead (FOH), bit-stuffing overhead (SOH), packet size (PS) and percentage overhead (%OH) under each of a number of conditions, including no stuffing and minimum sized packet, maximum stuffing and minimum sized packet, no stuffing and maximum sized packet, and maximum stuffing and maximum sized packet. A number of assumptions are made in the packet overhead computation, including a packet size of 40 to 9600 bytes, a worst-case SOH of 20% of the packet size, and an FOH from 5 to 8 bytes. The results shown assume the maximum FOH of 8 bytes.

It can be seen from the diagram that, as indicated previously, the packet overhead percentage can vary from almost zero, that is, 0.08%, to as much as 40%. Failure to provide per-channel flow control in the presence of this type of substantial variation in packet overhead can result in a number of problems, including link underutilization as well as buffer underflow and overflow conditions. Although conventional traffic shaping techniques without per-channel flow control can be used to mitigate the effects of the variation due to FOH (and such mitigation will be assumed in the following analysis), the variation due to SOH generally cannot be mitigated using conventional traffic shaping techniques, particularly in HCC packet-based applications.

The worst-case or slowest HDLC channel rate in FIG. 3 occurs with maximum HDLC bit stuffing and a maximum sized packet, corresponding to a 20% SOH condition. This condition slows the line throughput to 80% of the nominal rate, denoted in this case as the maximum achievable HDLC channel rate of 100%.

The above HDLC example may be contrasted with the typical situation in ATM cell-based applications, where the overhead-to-payload ratio is fixed, thereby allowing rate shaping with no per-channel backpressure detection to be used in many applications while still providing for reasonably high link utilization. However, the present invention can be utilized with ATM as well as with other protocols.

In accordance with the present invention, the above-described variation in packet overhead associated with HDLC applications is compensated using in-band flow control and multiple-rate traffic shaping techniques. Advantageously, these techniques in the illustrative embodiments provide a backpressure mechanism that may be used to throttle the flow of data from the LLD 102 to the PLD 104 during times of high packet overhead to avoid egress queue (EQ) overruns in the PLD. During periods in which backpressure is detected, any data destined to a backpressured EQ of the PLD may accumulate in the relatively large buffer space of the LLD and can be processed using the traffic management capabilities of the LLD.

The in-band flow control is implemented in the illustrative embodiments by configuring the egress queues (EQs) in the PLD 104 such that each of the EQs has associated therewith a programmable pair of thresholds, and providing an associated in-band flow control (IBFC) message generation capability in the PLD.

More specifically, each EQ has a pair of threshold settings, denoted UPPER and LOWER herein. When IBFC functionality is enabled, crossing the UPPER threshold in the positive direction will trigger generation of an IBFC OVER message. Similarly, crossing the LOWER threshold in the negative direction will trigger generation of an IBFC UNDER message. This use of two thresholds effectively provides hysteresis, allowing a flexible tradeoff between EQ buffer size and IBFC message frequency. A larger hysteresis offset will require a larger buffer size but will cause IBFC messages to be generated less frequently on average.

Figure 4:
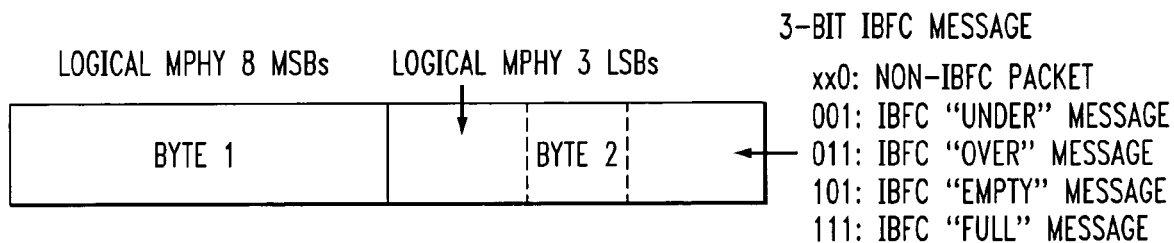
FIG. 4 shows an in-band flow control (IBFC) message format for delivery from a physical layer device to a link layer device in an illustrative embodiment of the invention.

When a valid threshold crossing occurs, an IBFC message generator in the PLD 104 creates an IBFC message. An example IBFC message format, comprising a pair of bytes denoted Byte 1 and Byte 2, is shown in FIG. 4. The bits of Bytes 1 and 2 are also referred to as bits 0 through 15, with bit 0 corresponding to the first bit in Byte 1 and bit 15 corresponding to the final bit in Byte 2. In this example, Byte 1 generally represents an in-band SPI-3 address. The last three bits in Byte 2 of the message convey the IBFC information in the manner indicated in the figure. The logical MPHY (LMPHY) value used in the 2-byte message format is set to the LMPHY value of the EQ in which the threshold crossing occurred. The IBFC messages are preferably transmitted with the highest priority on the SPI-3 ingress interface between the PLD and the LLD.

In addition to a threshold crossing, there are two other conditions that can trigger an IBFC message. If the EQ fills up, an IBFC FULL message will be generated. If the EQ underruns and causes an abort, indicating an underrun that is not due to a normal inter-packet gap, an IBFC EMPTY message will be generated. These cases provide a recovery mechanism in the event that an IBFC OVER or IBFC UNDER message generated by the threshold crossing is corrupted or lost.

If an EQ experiences an overrun, this is considered an error condition. The current packet is aborted and any subsequent data that is sent to be enqueued on that EQ is discarded until the EQ level drops below the OVER threshold.

The LLD 102 will receive the IBFC message on its ingress SPI-3 interface. The LLD classifier 112 is configured to recognize a given received packet as an IBFC packet based on bit 15, that is, the lowest order bit of Byte 2 in FIG. 4, where a logic '0' value indicates a non-IBFC packet and a logic '1' value indicates an IBFC packet. If it is determined that a given received packet is an IBFC packet, Byte 2 thereof will be routed by the classifier to a Class of Service (CoS) queue, which may illustratively be in the traffic manager 116 of the LLD. The CoS queue is one of a plurality of such queues that are served by a Quality of Service (QoS) queue that is associated with the LMPHY that generated the IBFC message. In addition to the IBFC CoS queue, there are preferably a number of additional CoS queues to support various traffic classes on the same LMPHY.

Figure 5:
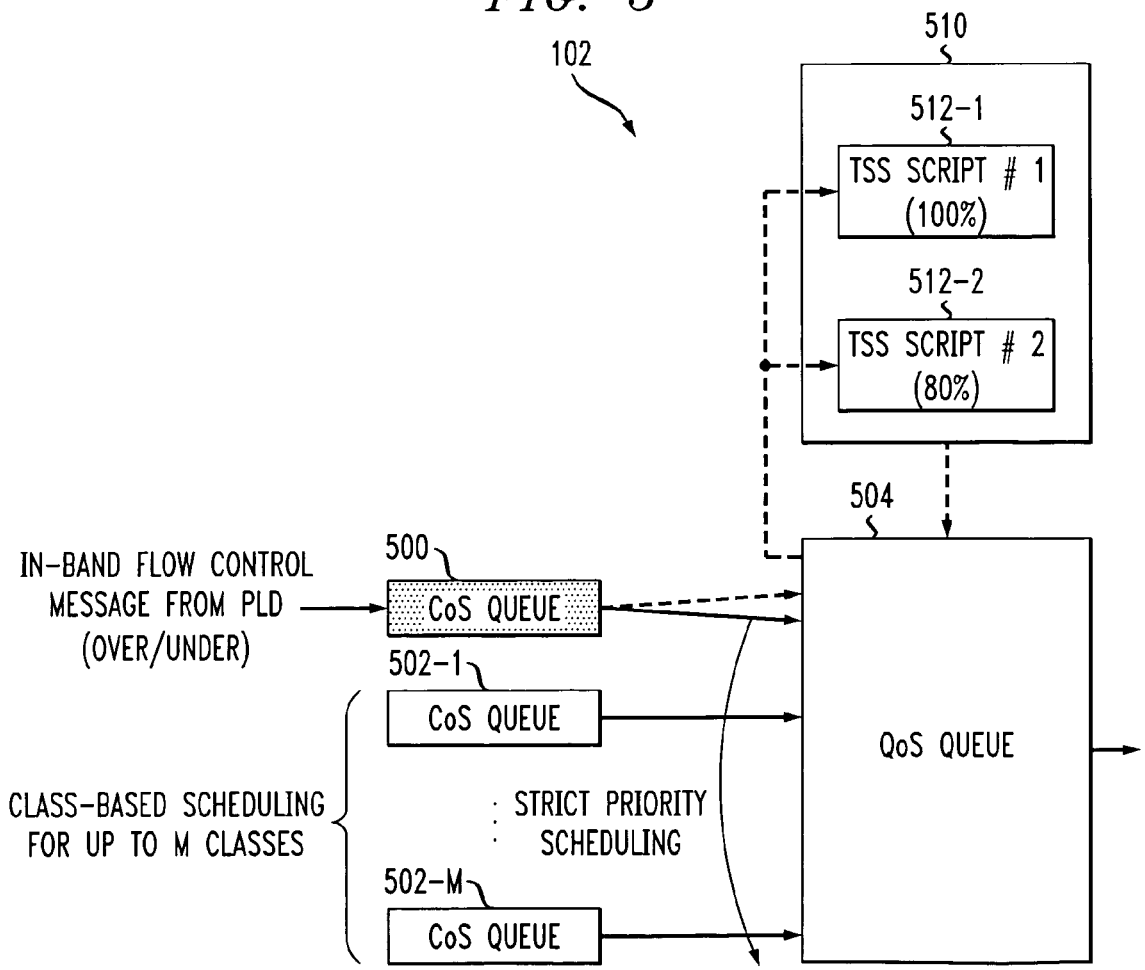
FIG. 5 shows a more detailed view of a portion of a link layer device, showing the processing of an IBFC message received from the physical layer device, and provision of multiple-rate traffic shaping based on the IBFC message.

FIG. 5 shows a portion of the LLD 102, illustrating the above-described CoS and QoS queues. This portion of the LLD may be implemented at least in part in the traffic manager 116, or elsewhere in the LLD.

The IBFC message from the PLD is routed to a first CoS queue 500. The CoS queue 500 and an additional M CoS queues, denoted 502-1, . . . 502-M, are each associated with a QoS queue 504 as shown. Also associated with the QoS queue 504 is a traffic shaping element 510 which includes a first traffic shaping script (TSS) 512-1, denoted TSS Script 1, and a second TSS 512-2, denoted TSS Script 2. Each of the TSSs 512-1 and 512-2 has a particular scheduling rate, denoted in percentages of the HDLC channel rate. The rates of the TSSs 512-1 and 512-2 are 100% and 80%, respectively.

The CoS queue 500 for the IBFC message has the highest priority. Whenever that CoS queue is serviced, bit 14 of the IBFC message is examined to determine whether the message is an OVER or UNDER message, and then the packet is discarded. Based on the results of this OVER/UNDER test, one of the two TSSs 512-1 and 512-2 will be selected for use in scheduling packets from the corresponding QoS queue 504. This will cause packets from the QoS queue 504 to be scheduled at one of two possible rates relative to the nominal HDLC channel rate, namely, the 100% rate of TSS 512-1 in response to an IBFC UNDER message, or the 80% rate of TSS 512-2 in response to an IBFC OVER message.

Advantageously, use of the 80% rate of TSS 512-2 in the illustrative embodiments will guarantee that the EQ level cannot increase further once the new scheduler rate is set. This is true because, as noted above, the worst-case or slowest HDLC channel payload rate occurs with maximum HDLC bit stuffing, which adds a 20% overhead to the payload and slows the line throughput to 80% of the nominal, maximum achievable rate. Since the scheduling rate for the QoS queue 504 is set equal to this lower-bound channel rate in response to the OVER message, the EQ level is guaranteed not to increase further, and will eventually decrease over time assuming that the data pattern tends towards randomness.

As a more particular example of the above-described arrangement, assume that a PLD EQ buffer identified as LMPHY 256 is servicing a DS0 HDLC channel and is being used with the IBFC functionality activated. Initially, the corresponding LLD QoS queue scheduling rate is set at 100% of the nominal channel rate, after accounting for any frame overhead. Now assume a stream of data that requires above-average HDLC bit-stuffing is transmitted to that EQ. Eventually, the EQ upper threshold would be crossed due to the mismatch between the link rate after stuffing and the LLD data rate for that EQ before stuffing.

The threshold crossing would cause an OVER message to be generated on LMPHY 256. This message would be transmitted across the ingress SPI-3 interface and classified by the LLD, and the result would be sent to the IBFC CoS queue for LMPHY 256. The message would be processed and as a result, the scheduling rate would be updated such that the QoS queue transmits at 80% of the nominal channel rate. At some later point, the lower threshold for the same PLD EQ would be crossed, assuming nearly random data, and the process described above would repeat itself, except that the scheduling rate would be updated to cause the QoS queue to transmit at 100% of the nominal channel rate.

It should be noted that the use of two different scheduling rates in FIG. 5 is by way of example only. Other embodiments of the invention may utilize any desired number of selectable scheduling rates, by providing corresponding TSSs or other similar mechanisms. Also, the particular selectable rates are exemplary only, determined based on the overhead conditions associated with HDLC as previously described. Other arrangements of selectable rates may be used, such as selection between 95% and 105% rates, and so on. The invention can be used with any type of dual-rate or more generally n-rate traffic shaping. Furthermore, traffic shaping characteristics other than scheduling rate may be altered responsive to IBFC messages in alternative embodiments of the invention.

Additional examples of in-band flow control in accordance with the invention will now be described with reference to FIGS. 6 and 7. Although multiple-rate traffic shaping is not shown in these figures, such shaping may be implemented therein in a manner similar to that described above in conjunction with FIG. 5. As noted above, the in-band flow control and multiple-rate traffic shaping techniques of the invention can be used separately or in combination.

Figure 6:
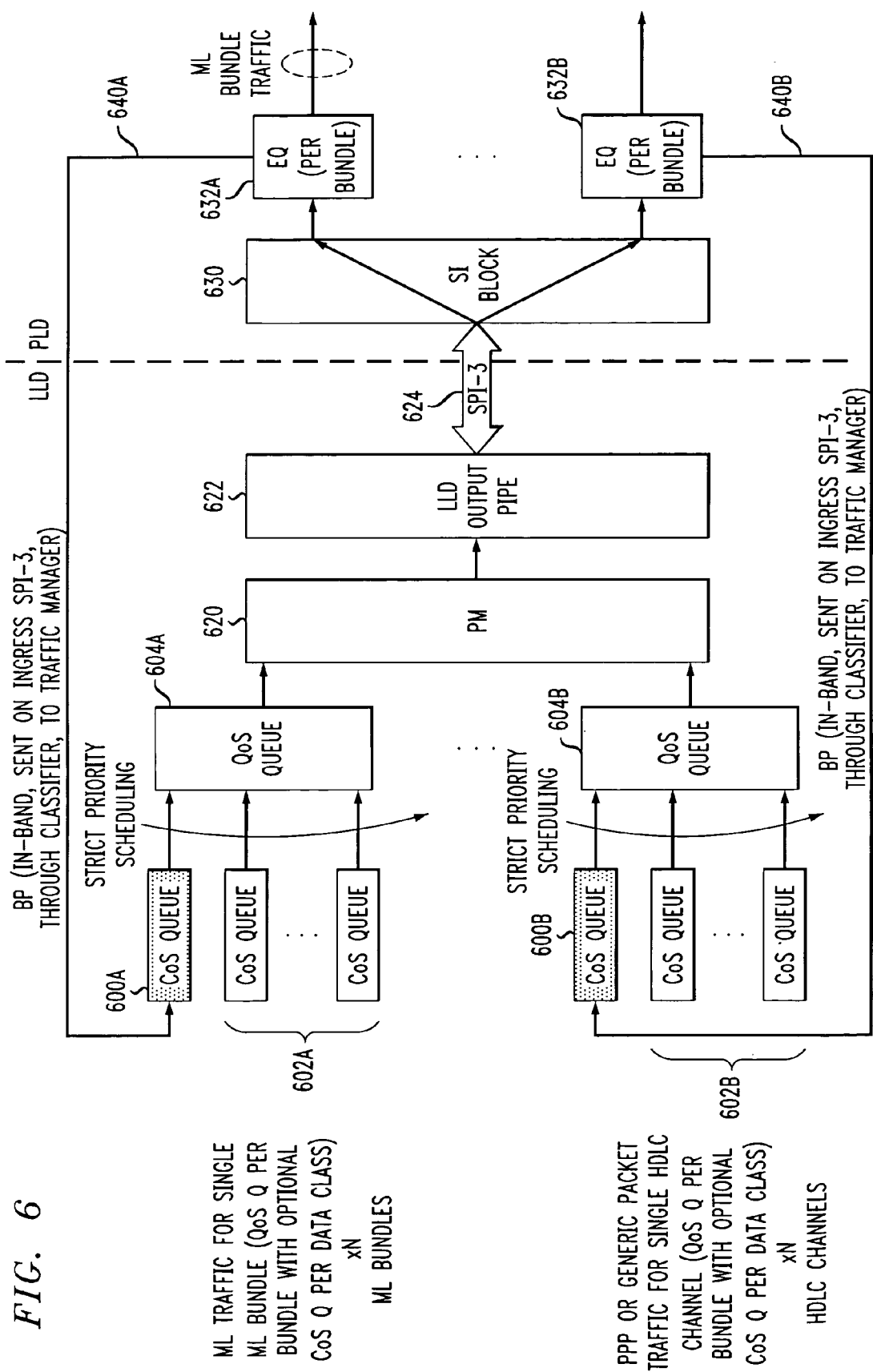
FIGS. 6 and 7 show examples of in-band flow control implementable in the system of FIG. 1 in accordance with the invention.

FIG. 6 illustrates portions of the LLD 102 and PLD 104 in an application involving a combination of PPP or generic packet traffic and multilink (ML) traffic. The ML traffic is assumed to be ML-only, with no multiclass (MC) classes. Only a single EQ per channel is required in the PLD for each traffic type (PPP, generic or ML). Each EQ of the PLD is mapped to a corresponding QoS queue of the LLD. At least two CoS queues of the LLD are used for each channel, one for the IBFC message from the PLD and one for data traffic. Thus, in an LLD in which up to 16 total CoS queues are available for a given channel, up to 15 different traffic classes may be supported for each channel.

The ML traffic for a single ML bundle is processed utilizing a CoS queue 600A for the IBFC message and a set of additional CoS queues 602A for data traffic. The CoS queues 600A and 602A are scheduled via QoS queue 604A using strict priority scheduling. Each link in the ML bundle will also typically have a non-ML PPP channel dedicated to it for Link Control Protocol (LCP) traffic and other similar functions, although the corresponding queues are not shown in the figure. In addition, although the processing for only a single ML bundle is shown, there may be N such bundles processed by the LLD and PLD in a given implementation.

The PPP or generic packet traffic for a single HDLC channel is processed utilizing a CoS queue 600B for the IBFC message and a set of additional CoS queues 602B for data traffic. The CoS queues 600B and 602B are scheduled via QoS queue 604B using strict priority scheduling. Although the processing for only a single HDLC channel is shown, there may be N such channels processed by the LLD and PLD in a given implementation.

Output from the QoS queues 604A, 604B is supplied via a port manager (PM) element 620 to an LLD output pipe 622 which is coupled via a standard SPI-3 interface 624 to a system interface (SI) block 630 of the PLD. The SI block 630 is coupled to EQs 632A and 632B as shown. IBFC messages generated by the EQs 632A, 632B are supplied to the respective CoS queues 600A, 600B of the LLD, as illustrated at 640A, 640B, respectively. As was described in greater detail above, the IBFC messages in the illustrative embodiments provide flow control indications or other backpressure information that is sent in-band, on the ingress SPI-3 interface, from the PLD to the LLD, through the classifier 112 to the traffic manager 116.

Figure 7:
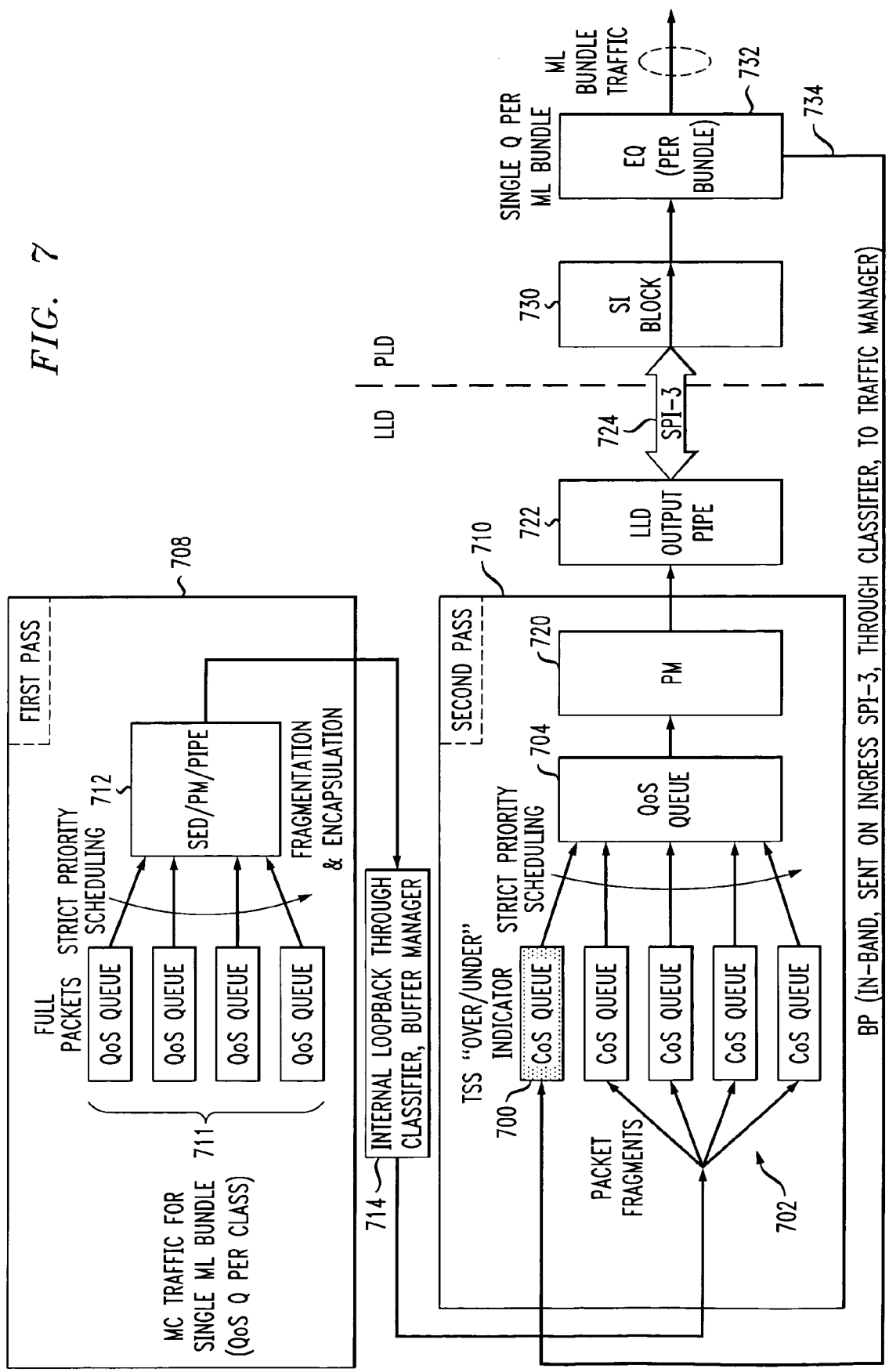

FIG. 7 illustrates portions of the LLD 102 and PLD 104 in an application involving ML/MC fragmentation and encapsulation. The LLD in this example is utilized as an ML/MC fragmentation and encapsulation (frag/encap) engine. Advantageously, this arrangement provides the option of using IBFC even for ML/MC-PPP applications, so that all packet protocol types can use IBFC if desired. The tradeoff is that it requires more processing bandwidth due to the use of a two-pass approach.

The LLD includes a CoS queue 700 used for the IBFC message from the PLD, and a set of additional CoS queues 702 for scheduling packet fragments via QoS queue 704 using strict priority scheduling.

In this example, packets make two passes through the LLD, denoted generally as first pass 708 and second pass 710. The first pass 708 does not provide traffic management. Instead, it simply performs the frag/encap function as quickly as possible, performing strict priority scheduling over a set of QoS queues 711 utilizing an SED/PM/pipe element 712, where SED denotes a stream editor. Such a stream editor may be used to provide data modification capability in an output pipe of the LLD, for example, modification of a packet.

The first pass 708 uses the QoS queues 711 to schedule packets in order to support sequence number generation required for MC fragment header encapsulation. The second pass 710 schedules the fragments to an EQ 732 in the PLD, utilizing CoS queues 700, 702, QoS queue 704, and PM element 720. The EQ 732 corresponds to a single ML bundle. Data traffic is coupled via LLD output pipe 722 and SPI-3 interface 724 to SI block 730 of the PLD and thereby to the EQ 732. The second pass performs class-based scheduling of the MC fragments using a traffic model similar to the one in the previous example, where again, the bundle is managed as a single channel with multiple classes.

In this approach, the PLD is configured in a "multilink-like" mode in which it schedules bundle fragments on a first-come-first-served basis without regard to class. This mode is nearly the same as a standard multilink mode except that it bypasses the fragmentation/encapsulation engine in the PLD, since these functions are performed by the LLD.

Again, only a single PLD EQ per bundle is required. The packets are scheduled by the LLD via the second pass QoS queue 704. Each EQ is mapped to a second pass QoS queue and each class is mapped to a second pass CoS queue. The IBFC message flow is mapped to the highest priority second pass CoS queue 700.

As shown in the figure, an IBFC message generated by the EQ 732 is supplied as illustrated generally at 734 to the CoS queue 700. The IBFC message provides a flow control indication or other backpressure information that is sent in-band, on the ingress SPI-3 interface, from the PLD to the LLD, through the classifier 112 to the traffic manager 116.

Techniques for determining appropriate sizes for the EQs of the PLD will now be described with reference to FIGS. 8, 9 and 10.

Figure 8:
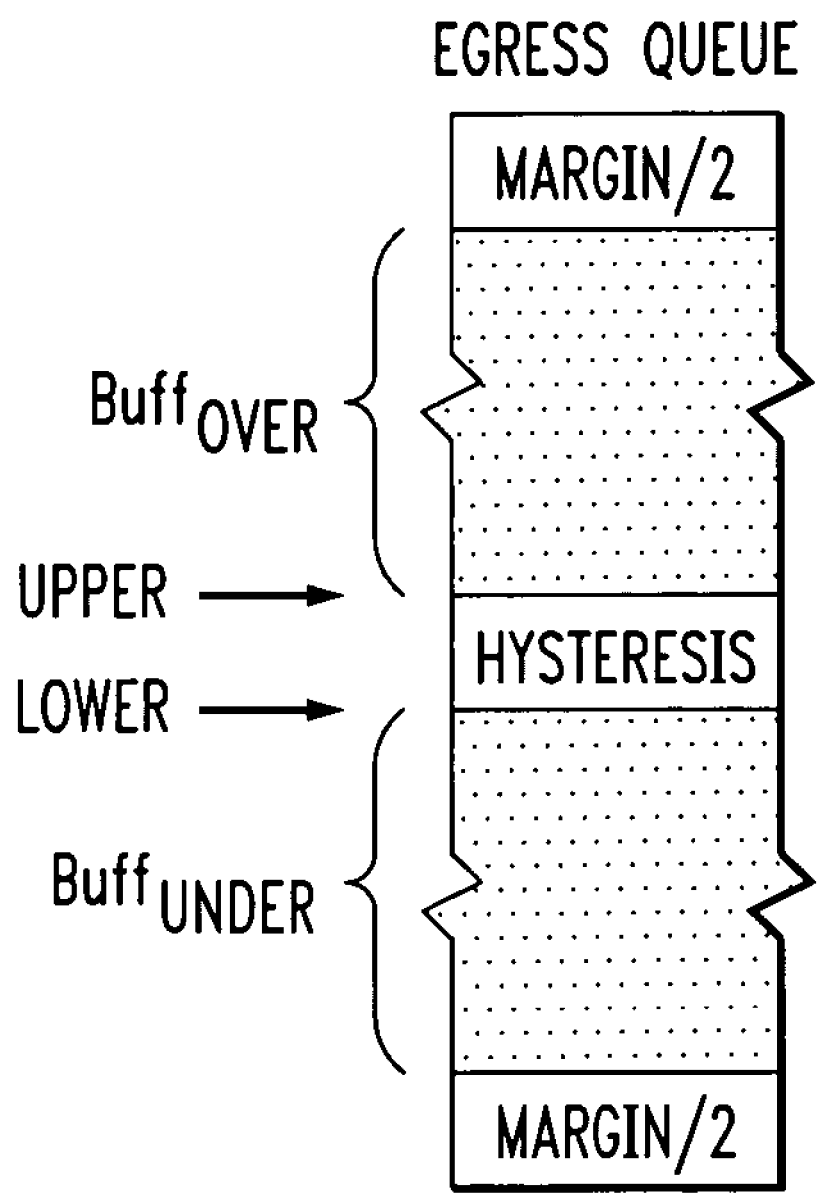
FIG. 8 illustrates an example egress queue in the physical layer device of the FIG. 1 system.

FIG. 8 shows an exemplary configuration of a single EQ in the PLD. Other EQs in the PLD can be configured in a similar manner. The UPPER and LOWER thresholds described above are shown, and define a hysteresis region as indicated in the figure. The total EQ size can be expressed as follows:

$$EQ\text{size} = \text{Buff}_{OVER} + \text{Buff}_{UNDER} + \text{Margin} + \text{Hysteresis} \quad \text{(Equation 1)}$$

where $\text{Buff}_{OVER}$=minimum amount of buffer space required to account for flow control latency (FCL) once OVER message has been sent, $\text{Buff}_{UNDER}$=minimum amount of buffer space required to account for FCL once UNDER message has been sent, Margin=amount of queue space allocated to account for EQ buffer underutilization and system margin, and Hysteresis=difference between UPPER and LOWER threshold settings.

The $\text{Buff}_{OVER}$ and $\text{Buff}_{UNDER}$ may be byte quantities that are directly proportional to the FCL. For example, assume the UPPER threshold is crossed because the LLD TSS rate for that EQ is 100% of the line rate, but HDLC bit stuffing is occurring at the maximum rate of 20%, causing the line rate (EQ dequeue rate) to be 20% less than the LLD TSS rate (EQ enqueue rate). This condition will persist, and the EQ level will continue to increase, until the LLD has recognized the OVER IBFC message from the PLD that was generated as a result of the UPPER threshold crossing, and has responded to the OVER message by changing the TSS traffic rate to 80%. Once this change is made, the EQ level can no longer increase. It will either decrease, or in the worst case (if bit stuffing remains at the maximum 20% rate) the EQ level will remain constant. The FCL is the time that elapses from the initial UPPER threshold crossing to the change in the TSS data rate, and is related to a value referred to herein as Buff.

FIG. 9 shows the derivation of equations for Buff as a function of maximum transmission unit (MTU) size and port rate, $R_{PORT}$. From these results, it is apparent that the MTU size dominates the Buff result for any appreciable packet size. In the illustrative embodiments, data is transmitted from the LLD CoS queues on a frame basis, so once a lower-priority queue begins transmission of a packet, it cannot be preempted by a higher-priority CoS queue until the frame completes transmission. So if an IBFC message is enqueued into a CoS queue just after the start of transmission of an MTU-length packet in a lower-priority CoS queue of the same flow, the IBFC message will not be dequeued until the complete lower-priority MTU-length packet has been transmitted.

It should also be noted that $Buff_{OVER}$ is slightly less than $Buff_{UNDER}$ because the worst-case flow control latency is somewhat less. The reason for this is that an MTU will be transmitted at the 100% rate when the buffer is filling but is transmitted at the 80% rate when the buffer is emptying, which takes longer, increasing the FCL for the latter case.

FIG. 10 provides some sample results using the equations shown in FIG. 9 and assuming several commonly occurring MTU sizes and several HDLC channel sizes. The FIG. 9 equations are used to compute $Buff_{UNDER}$ and $Buff_{OVER}$ in the table of FIG. 10. The sum of these two Buff values is used to compute the lower bound on the required EQ size. The margin and hysteresis are added to the lower bound to determine a worst case EQ size for a particular application.

As mentioned previously, there is a tradeoff between hysteresis, EQ size and IBFC message frequency. More hysteresis requires a larger EQ, but will result in fewer IBFC messages. Even with hysteresis approaching zero (i.e., the UPPER and LOWER thresholds being set to the same level) it is likely that the frequency of IBFC message generation would not have a significant impact on the SPI-3 bus utilization for many applications. However, for the results shown in FIG. 10, a hysteresis value of 64 bytes is assumed.

Regarding the margin setting, the primary consideration is the traffic profile, with respect to packet sizes, versus the EQ buffer size. The PLD EQs and thresholds may be block-based rather than byte based. The size of the buffer blocks used to store EQ data may be programmable on a per-channel basis from, for example, 32 to 256 bytes.

Consider a case in which the EQ buffer size is set to 64 bytes, and there is a sustained burst of data traffic that is comprised of 65-byte packets. In this case, each packet will require two EQ buffers, or 128 bytes, to store the 65-byte packet. For such a scenario, the margin would need to be set equal to the sum of the Buff values to account for the approximate 50% buffer utilization inefficiency. Therefore the worst-case EQ size required can be derived from Equation 1 and is given by:

$$EQsize_{W.C.} = 2*(Buff_{OVER} + Buff_{UNDER}) + Hysteresis \quad \text{(Equation 2)}$$

Equation 2 was used to compute the values shown in the last column of the FIG. 10 table.

By way of example, the PLD may be configured such that, when used with external buffer memory, it can support enough buffer memory to allocate, on average 2031 bytes per EQ if 2016 EQs are used. From the DS0 examples of the FIG. 10 table, it is evident that such a PLD could support all 2016 channels with an MTU size of roughly 2200 bytes per channel using the margin and hysteresis assumptions stated above. Of course, a designer is free to allocate buffer memory as required for each EQ so that the channel rates, MTU sizes, hysteresis values, and other parameters can be tailored to the needs of a particular application.

An advantage of the illustrative embodiments described above is that in-band flow control and multiple-rate traffic shaping may be provided using a standard interface between the LLD and the PLD, such as an SPI-3 interface. The invention can be used in conjunction with or as an alternative for conventional SPI-3 backpressure-based flow control. For example, the PLD may be configured such that channels can be independently configured to use either in-band flow control in accordance with the invention or conventional backpressure-based flow control using standard SPI-3 techniques.

An LLD or PLD in accordance with the invention may be implemented as an integrated circuit device suitable for installation on a line card or port card of a router or switch. Numerous other configurations are possible.

The above-described embodiments of the invention are intended to be illustrative only. For example, although illustrated using HDLC and PPP, the invention can be used with other protocols, and other types of PDUs. In addition, other types of in-band signaling may be used to convey an in-band flow control message from a PLD to an LLD, and other types of in-band flow control message formats may be used. Also, the particular traffic shaping arrangements may be varied, and as a more particular example, selection between any number of scheduling rates or other traffic shaping characteristics may be provided. These and numerous other alternative embodiments within the scope of the following claims will be readily apparent to those skilled in the art.

What is claimed is:

1. A method for providing backpressure information from a physical layer device to a link layer device in a communication system, the method comprising the steps of:
    generating a flow control message in the physical layer device responsive to a detected condition relating to at least a given one of a plurality of egress queues of the physical layer device; and
    transmitting the flow control message from the physical layer device to the link layer device;
    wherein the flow control message comprises backpressure information associated with the given queue of the physical layer device and is transmitted from the physical layer device to the link layer device as an in-band message over an interface between the physical layer device and the link layer device; and
    wherein the link layer device is operative to alter a characteristic of a flow of data from the link layer device to the physical layer device responsive to the backpressure information in the flow control message.

2. The method of claim 1 wherein the given queue has an upper threshold and a lower threshold associated therewith, corresponding to respective fullness levels of the queue.

3. The method of claim 2 wherein the flow control message comprises backpressure information indicating that the queue fullness has crossed the upper threshold from below that threshold.

4. The method of claim 2 wherein the flow control message comprises backpressure information indicating that the queue fullness has crossed the lower threshold from above that threshold.

5. The method of claim 1 wherein the flow control message comprises in addition to the backpressure information an identifier of the given queue with which the backpressure information is associated.

6. The method of claim 5 wherein the identifier comprises a logical MPHY value corresponding to the given queue.

7. The method of claim 1 wherein the flow control message identifies a particular one of a plurality of detected conditions relating to the given queue, the plurality of detected conditions comprising at least an over-threshold condition and an under-threshold condition.

8. The method of claim 7 wherein the plurality of detected conditions further comprises an empty queue condition and a full queue condition.

9. The method of claim 1 wherein the interface between the physical layer device and the link layer device comprises an SPI-3 ingress interface.

10. The method of claim 9 wherein the flow control message is transmitted at a highest priority level on the SPI-3 ingress interface between the physical layer device and the link layer device.

11. The method of claim 1 wherein the flow control message is deliverable from the physical layer device to a designated queue of the link layer device.

12. The method of claim 11 wherein the designated queue comprises a class of service (CoS) queue of the link layer device.

13. The method of claim 12 wherein the CoS queue is one of a plurality of CoS queues serviced by a quality of service (QoS) queue of the link layer device.

14. The method of claim 1 wherein the link layer device is operative to perform multiple-rate traffic shaping responsive to the backpressure information in the flow control message.

15. The method of claim 14 wherein the link layer device is operative to perform the multiple-rate traffic shaping by selecting one of a plurality of available scheduling rates for a channel associated with the egress queue of the physical layer device responsive to backpressure information in the flow control message.

16. The method of claim 15 wherein the link layer device is operative to perform the multiple-rate traffic shaping by selecting a first one of the plurality of available scheduling rates for the channel if the backpressure information indicates an under-threshold condition, and selecting a second one of the plurality of available scheduling rates for the channel if the backpressure information indicates an over-threshold condition.

17. The method of claim 16 wherein the first and second rates correspond to 100% and 80%, respectively, of a nominal High-level Data Link Control (HDLC) channel rate.

18. An apparatus for use in generating backpressure information for transmission to a link layer device in a communication system, the apparatus comprising:
a physical layer device connectable to the link layer device and operative to generate a flow control message responsive to a detected condition relating to at least a given one of a plurality of egress queues of the physical layer device, the flow control message being transmittable from the physical layer device to the link layer device;
wherein the flow control message comprises backpressure information associated with the given queue of the physical layer device and is transmitted from the physical layer device to the link layer device as an in-band message over an interface between the physical layer device and the link layer device; and
wherein the link layer device is operative to alter a characteristic of a flow of data from the link layer device to the physical layer device responsive to the backpressure information in the flow control message.

19. An apparatus for use in processing backpressure information received from a physical layer device in a communication system, the apparatus comprising:
a link layer device connectable to the physical layer device and operative to receive from the physical layer device a flow control message generated in the physical layer device responsive to a detected condition relating to at least a given one of a plurality of egress queues of the physical layer device;
wherein the flow control message comprises backpressure information associated with the given queue of the physical layer device and is transmitted from the physical layer device to the link layer device as an in-band message over an interface between the physical layer device and the link layer device; and
wherein the link layer device is operative to alter a characteristic of a flow of data from the link layer device to the physical layer device responsive to the backpressure information in the flow control message.

20. A method for providing multiple-rate traffic shaping in a link layer device in a communication system, the method comprising the steps of:
receiving from a physical layer device of the system a flow control message generated in the physical layer device responsive to a detected condition relating to at least a given one of a plurality of egress queues of the physical layer device; and
selecting one of a plurality of available traffic shaping characteristics for utilization with a given channel between the link layer device and the physical layer device based at least in part on the flow control message; and
wherein the link layer device is operative to alter a characteristic of a flow of data from the link layer device to the physical layer device responsive to the backpressure information in the flow control message.

* * * * *